United States Patent [19]

De Filippo

[11] Patent Number: 5,756,950
[45] Date of Patent: May 26, 1998

[54] MOTOR VEHICLE STEERING WHEEL SWITCH

[75] Inventor: Emilio De Filippo, Bruzolo, Italy

[73] Assignee: Gestind-M.B. Manifattura di Bruzolo Spa, Turin, Italy

[21] Appl. No.: 766,001

[22] Filed: Dec. 13, 1996

[30] Foreign Application Priority Data

Jul. 16, 1996 [IT] Italy ................... TO96A0608

[51] Int. Cl.⁶ ................................................ H01H 9/00
[52] U.S. Cl. ................................ 200/61.54; 200/61.57
[58] Field of Search ........................ 200/61.54–61.57, 200/85 R, 86 R

[56] References Cited

U.S. PATENT DOCUMENTS

| | | | |
|---|---|---|---|
| 1,779,329 | 10/1930 | Panzetta | 200/61.54 |
| 2,796,484 | 6/1957 | Wolf | 200/61.57 |
| 2,946,869 | 7/1960 | Parks et al. | 200/61.57 |
| 3,544,746 | 12/1970 | Wolf et al. | 200/61.57 X |
| 3,838,236 | 9/1974 | Wolf et al. | 200/61.56 |
| 4,325,568 | 4/1982 | Clark et al. | 200/61.55 X |
| 4,447,684 | 5/1984 | Sugiyama | 200/61.54 |
| 4,742,192 | 5/1988 | Levine et al. | 200/61.57 |
| 5,228,362 | 7/1993 | Chen et al. | 200/61.55 X |
| 5,338,906 | 8/1994 | Yokota | 200/61.54 |
| 5,627,352 | 5/1997 | Suzuki et al. | 200/61.54 |

*Primary Examiner*—J. R. Scott
*Attorney, Agent, or Firm*—Sughrue, Mion, Zinn, Macpeak & Seas, PLLC

[57] ABSTRACT

A motor vehicle steering wheel comprising a plastic material body overmoulded on a framework and formed with at least one lateral seat housing a switch controlling a horn. The lateral seat of the body is delimited by a resiliently deformable integral front member which is part of the body, forming the operating press member of the switch. The switch is comprised of two normally spaced apart plates having a resilient element therebetween. The resilient element may be of integral one piece construction with the membrane and extend through an aperture in the adjacent plate.

6 Claims, 3 Drawing Sheets

MOTOR VEHICLE STEERING WHEEL SWITCH

BACKGROUND OF THE INVENTION

The present invention relates in general to motor vehicle steering wheels comprising a supporting framework formed by a rim and substantially radial spokes, and a relatively soft plastic material body overmoulded on the framework.

More particularly, the invention is directed to such steering wheels provided with at least one electrical horn control switch, incorporated within a lateral seat of the body in proximity of said rim and including a pair of substantially parallel contact metal plates, displaceable between a mutually distal inoperative position and a mutually proximal operative condition, resilient means interposed between said contact plates and acting so as to keep said plates in the inoperative position, and an operating press member acting on one of said plates to operate displacement thereof to said operative position.

In the known steering wheels of the above-referenced type the operating press member of the horn operating switch is formed by a separate element and the above resilient means are generally constituted by an elastically yielding body fitted between the two plates. The switch is separately assembled and subsequently mounted within the lateral seat of the steering wheel spoke, following manufacturing thereof.

This construction, besides being relatively complicated from the constructive point of view, involves additional production costs deriving from the assembling step of the above switch components.

SUMMARY OF THE INVENTION

The object of the present invention is to overcome the above drawback, and more particularly to provide a motor vehicle steering wheel of the type set forth in the above which can be manufactured in a more simple and economical way, by virtue of a reduction of the number of the switch components and of a simplified assembling thereof.

According to the invention, this object is achieved mainly by the fact that said lateral seat for the switch is axially delimited by an elastically deformable front membrane integrally formed with said body and defining said operating press member.

According to a first embodiment of the invention said one plate is operatively connected to said front membrane, and said resilient means are formed by at least one integral appendage of said membrane, projecting towards the other of said contact plates.

Due to this idea of solution the component number of the switch is in practice reduced of one half, since the traditional push-button and the return resilient means are directly formed, during manufacturing of the steering wheel, upon overmoulding the body on the framework. Further, also assembling of the switch and thus of the steering wheel as a whole is made remarkably more simple and cheap.

According to another advantageous aspect of the first embodiment of the invention, said at least one integral appendage defining said resilient means is engaged through a hole of said one plate and acts as a retaining member of said one contact plate relative to said front membrane.

In this embodiment the lateral seat for the switch may be axially delimited, on the side opposite to said front membrane, by a plug forcedly fitted into said seat and acting as a retaining member of the other of said two contact plates.

In a second embodiment of the invention the lateral seat is axially delimited, on the side opposite to said front membrane, directly by said body. In this case the seat is formed, upon moulding of the body, as a back draft so as to be closed at all sides thereof but the one from which the leads for electrical connection of the switch to the horn exit, through which the switch is mounted upon assembling the steering wheel.

BRIEF DESCRIPTION OF THE DRAWINGS

The invention will now be disclosed in detail with reference to the accompanying drawings, purely provided by way of non-limiting example, in which.

DETAILED DESCRIPTION OF THE INVENTION

Figure 1:
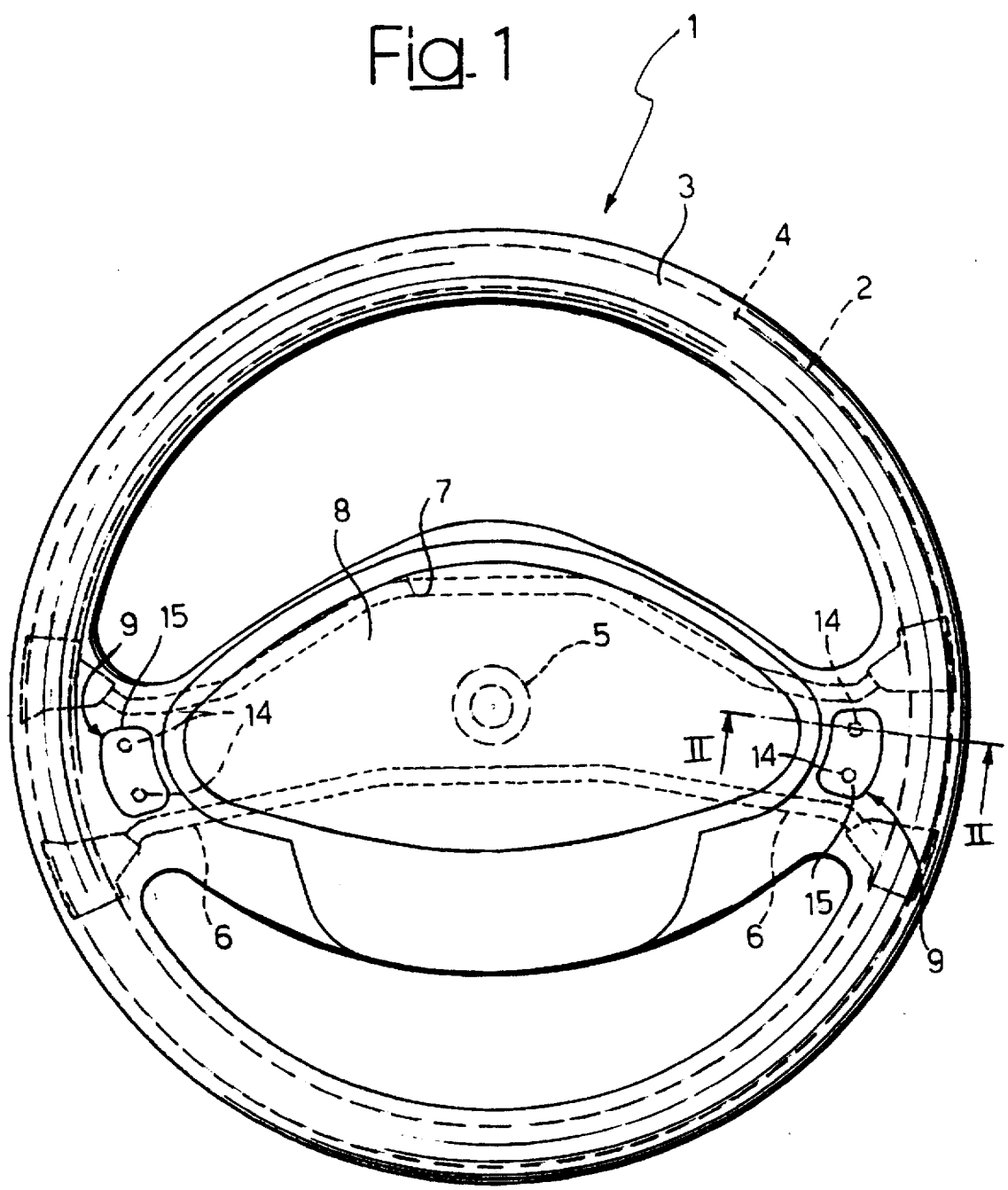
FIG. 1 is front elevational diagrammatic view showing a steering wheel for motor vehicles according to the invention.

In the drawings, reference numeral 1 generally designates a steering wheel for motor vehicles formed, in a generally conventional way, by a supporting framework 2, normally made of metal, on which a foamed plastic material lining body 3 is overmoulded.

The framework 2 defines a peripheral rim 4 connected to a central hub 5 by means of a pair of substantially radial spokes 6.

Forwardly of the hub 5, the body 3 is formed with a central recess 7 in correspondence of which an impact-absorbing safety element 8 is fitted, which is constituted by a pad to which an air-bag device may be operatively associated.

Between the opposite sides of the recess 7 and the rim 4, two switches 9 are housed within the body 3, which are to be actuated for operating, in a way known per se, a horn also of a conventional type, installed on board of the vehicle equipped with the steering wheel 1.

Figure 2:
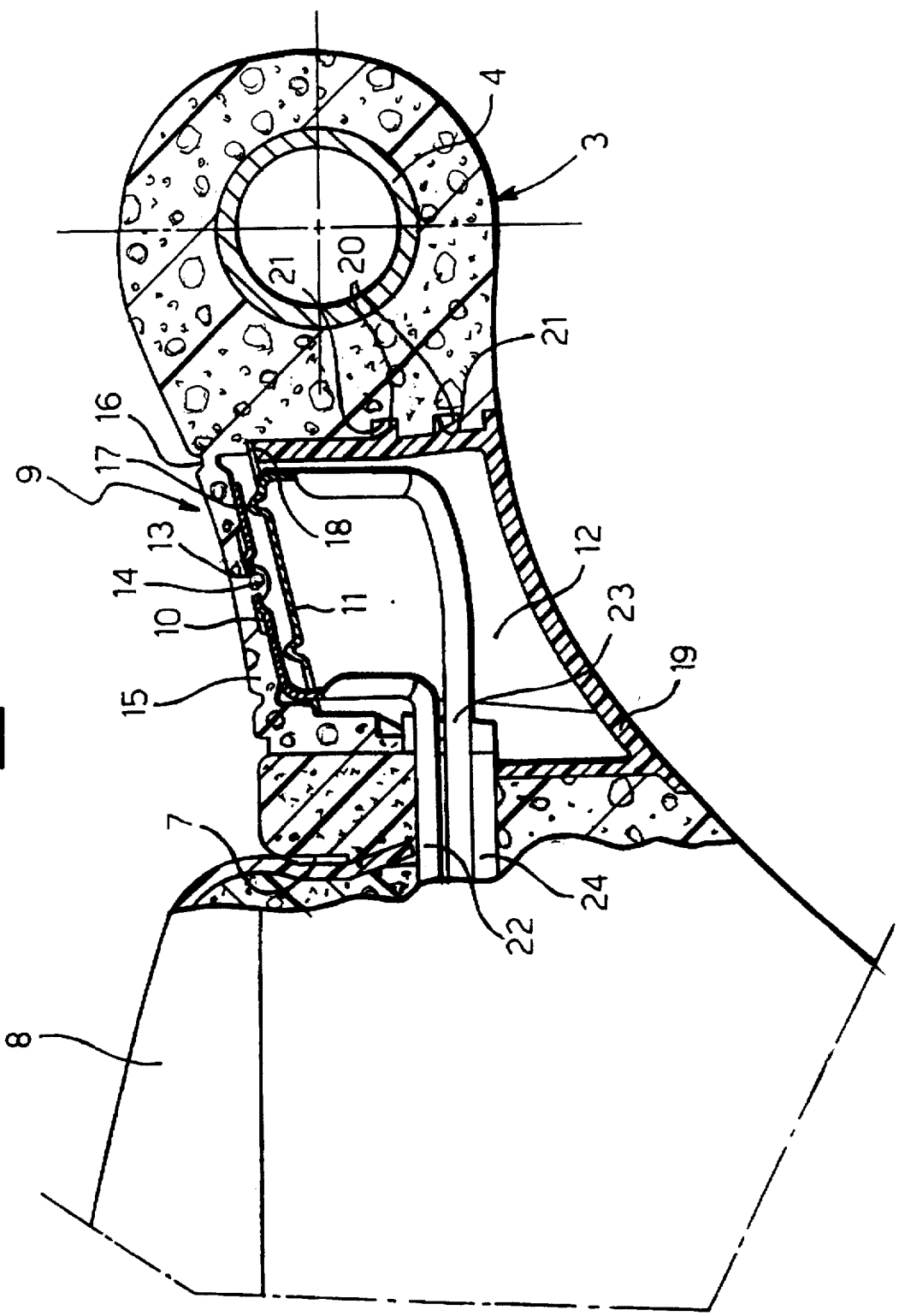
FIG. 2 is a cross-sectioned and enlarged view along line II—II of FIG. 1.

According to a first embodiment of the invention, and such as illustrated in better detail in FIG. 2, each control switch 9 comprises a front contact metal plate 10 and a rear contact metal plate 11 parallel and adjacent to each other, housed in correspondence of the front area (the area of a lateral seat 12 formed in the body 3, upon overmoulding thereof on the framework 2. The front area is the are facing towards the front side of the steering wheel.

The front contact plate 10 is movable and is provided with a pair of through holes 13, through which respective substantially mushroom-like resilient appendages 14 are engaged, which are integrally formed by moulding with an elastically deformable membrane 15 frontally closing the seat 12 and in turn integrally formed with the body 3 upon overmoulding thereof on the framework 2. Elastic deformation of the membrane 15, which constitutes the operating press member of the control switch 9, is aided by the presence of a thinned annular bridge element 16 joining this membrane 15 to the remaining portion of the body 3.

The rear contact plate 11, which is stationary, is formed with projections 17 facing towards the front contact plate 10, bears peripherally against a front annular shoulder 18 formed inside the seat 12, and is locked therewithin by means a plug 19, normally made of moulded plastic material, fitted and forcedly restrained within the seat 12, on the side thereof opposite to the front membrane 15. To such effect, the plug 19 is formed with outer ribs 20 fitted under pressure or by snap engagement into corresponding grooves 21 provided in the inner wall of the seat 12.

The two resilient appendages 14, which further act as retaining members for the front contact plate 10, bear against the rear contact plate 11 and define resilient elements urging the two plates 10 and 11 towards a mutually spaced-apart inoperative position, as depicted in FIG. 2.

The contact plates 10, 11 are electrically connected to respective leads 22, 23 connecting, through passages 24 formed in the body 3, the switch 9 with the vehicle horn. The switch-horn connection is not shown in detail since such a connection is conventional in the prior art.

In operation, a pressure applied by the user against the front membrane 15 produces, owing to elastic yielding of the membrane 15 and of the projections 14, approaching and closing of the front contact plate 10 against the rear contact plate 11 and, consequently, horn activation. When the pressure is released, the elastic return of the projections 14 and of the membrane 15 brings the plates 10 and 11 back to the mutual spaced-apart position corresponding to de-activation of the horn.

It will be evident from the foregoing that, by virtue of the above-disclosed arrangement of each switch 9, the steering wheel 1 according to the invention can be manufactured in a more simple and cheap way as compared to the conventional steering wheels of the same type. Namely, integration into the body 3 of the operating press member constituted by the membrane 15 and of the resilient means constituted by the projection 14 of each switch 9 remarkably simplifies both manufacturing of these switches 9, and assembling thereof relative to the body 3 of the steering wheel 1.

Figure 3:
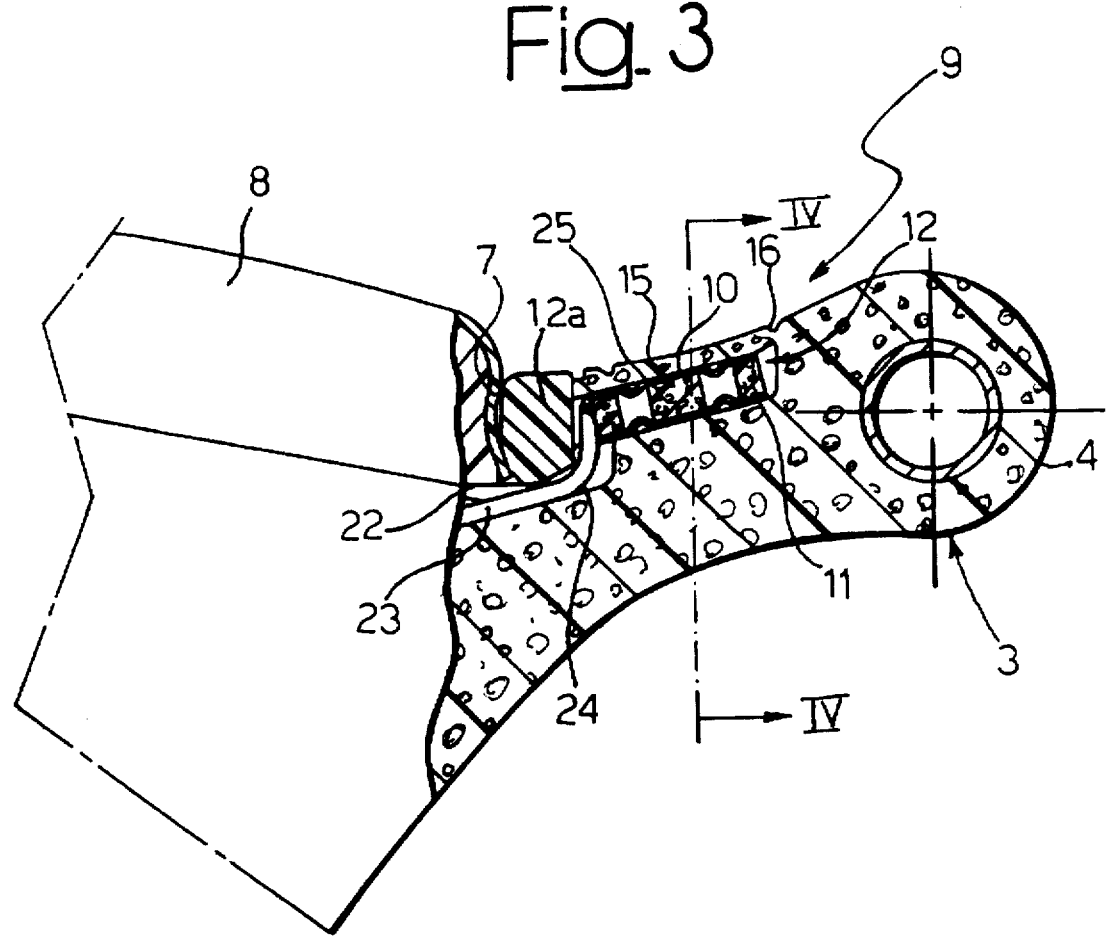
FIG. 3 is a view similar to FIG. 2, in a reduced scale, showing a variant of the invention.
Figure 4:
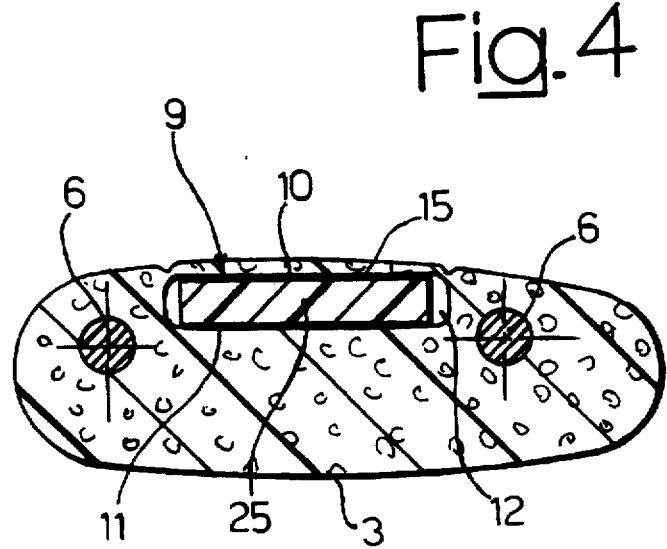
FIG. 4 is a cross-sectioned view along line IV—IV of FIG. 3.

The variant of the invention shown in FIGS. 3 and 4 is generally similar to the embodiment disclosed in the above, and only the differences will be disclosed in detail here below, employing the same numeral references for identical or similar parts. In this variant, the press member of the switch 9 is also constituted by the integral membrane 15 of the body 3, simply bearing on the movable plate 10, while the resilient member interposed between the plates 10 and 11 is constituted, in a conventional fashion, by a foamed plastic material pad 25, for instance made of polyurethane; bonded to the two plates 10, 11. Moreover the lateral seat 12 is closed both on the side opposite to the membrane 15, and at all other sides thereof but the inner side 12a from which the leads 22, 23 come out, directly by the body 3. Actually, the lateral seat 12 is in this embodiment produced, upon overmoulding of the body 3 on the framework 2, by means of a movable back draft mould insert. The plates 10, 11 along with the resilient member 25 are then mounted through the side 12a into the lateral seat 12.

Naturally the details of construction and the embodiments may be widely varied with respect to what has been disclosed and illustrated, without thereby departing from the scope of the present invention, such as defined in the appended claims.

I claim:

1. A steering wheel for motor vehicles comprising a supporting framework formed by a rim and substantially radial spokes, and a relatively soft plastic material body overmoulded on said framework, and at least one electrical horn control switch incorporated within a lateral seat of said body in proximity of said rim and including a pair of substantially parallel contact metal plates displaceable between a mutually distal inoperative position and a mutually proximal operative position, resilient means interposed between said contact plates and acting so as to keep said plates in said inoperative position, and an operating press member acting on one of said two plates to operate displacement thereof to said operative position, wherein an elastically deformable front membrane integrally formed with said body axially delimits said lateral seat for said switch so as to define said operating press member.

2. Steering wheel according to claim 1, wherein said one plate is operatively connected to said front membrane and said resilient means comprise at least one integral appendage of said membrane projecting towards the other of said two contact plates.

3. Steering wheel according to claim 2, wherein said at least one integral appendage is engaged through a hole of said one plate and defines a retaining member of said one plate relative to said front membrane.

4. Steering wheel according to claim 3, further comprising plug means axially delimiting said lateral seat on the side opposite to said front membrane, said plug means being forcedly fitted into said seat and defining a retaining member of the other of said two plates.

5. Steering wheel according to claim 2, wherein said resilient means comprise a pair of spaced-apart integral appendages of said front membrane.

6. Steering wheel according to claim 1, wherein said lateral seat is axially delimited, on the side opposite to said front membrane, directly by said body.

* * * * *